United States Patent
Sprangle et al.

(10) Patent No.: US 9,495,153 B2
(45) Date of Patent: *Nov. 15, 2016

(54) METHODS, APPARATUS, AND INSTRUCTIONS FOR CONVERTING VECTOR DATA

(71) Applicant: Intel Corporation, Santa Clara, CA (US)

(72) Inventors: Eric Sprangle, Austin, TX (US);
Robert D. Cavin, Sunnyvale, CA (US);
Anwar Rohillah, San Diego, CA (US);
Douglas M. Carmean, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 13/844,111

(22) Filed: Mar. 15, 2013

(65) Prior Publication Data
US 2013/0232318 A1    Sep. 5, 2013

Related U.S. Application Data

(63) Continuation of application No. 13/762,220, filed on Feb. 7, 2013, which is a continuation of application No. 11/964,631, filed on Dec. 26, 2007, now Pat. No. 8,667,250.

(51) Int. Cl.
*G06F 9/312*   (2006.01)
*G06F 9/302*   (2006.01)
*G06F 9/30*    (2006.01)

(52) U.S. Cl.
CPC ....... *G06F 9/30025* (2013.01); *G06F 9/30036* (2013.01); *G06F 9/30043* (2013.01)

(58) Field of Classification Search
None
See application file for complete search history.

(56) References Cited

U.S. PATENT DOCUMENTS

| | | | |
|---|---|---|---|
| 5,384,582 A   | 1/1995 | Keith et al. | |
| 5,673,407 A * | 9/1997 | Poland et al. | 712/222 |
| 5,812,147 A * | 9/1998 | Van Hook et al. | 345/537 |
| 5,892,697 A * | 4/1999 | Brakefield | 708/496 |
| 5,948,099 A   | 9/1999 | Crawford et al. | |
| 6,108,768 A * | 8/2000 | Koppala et al. | 712/214 |
| 6,247,116 B1  | 6/2001 | Abdallah et al. | |
| 6,263,426 B1  | 7/2001 | Abdallah et al. | |

(Continued)

OTHER PUBLICATIONS

Abrash (A First Look at the Larrabee New Instructions (LRBni)); Dr. Dobb's Journal; http://www.ddj.com/architect/216402188; published Apr. 1, 2009; accessed Jan. 14, 2010; 24 pages.*

(Continued)

*Primary Examiner* — Keith Vicary
(74) *Attorney, Agent, or Firm* — Nicholson De Vos Webster & Elliott LLP

(57) ABSTRACT

A computer processor includes a decoder for decoding machine instructions and an execution unit for executing those instructions. The decoder and the execution unit are capable of decoding and executing vector instructions that include one or more format conversion indicators. For instance, the processor may be capable of executing a vector-load-convert-and-write (VLoadConWr) instruction that provides for loading data from memory to a vector register. The VLoadConWr instruction may include a format conversion indicator to indicate that the data from memory should be converted from a first format to a second format before the data is loaded into the vector register. Other embodiments are described and claimed.

18 Claims, 8 Drawing Sheets

(56) References Cited

U.S. PATENT DOCUMENTS

| | | | |
|---|---|---|---|
| 6,266,769 B1 | 7/2001 | Abdallah et al. | |
| 6,292,815 B1 | 9/2001 | Abdallah et al. | |
| 6,393,452 B1* | 5/2002 | Renstrom | 708/495 |
| 6,480,868 B2 | 11/2002 | Abdallah et al. | |
| 6,502,115 B2 | 12/2002 | Abdallah et al. | |
| 6,591,361 B1* | 7/2003 | Liao et al. | 712/222 |
| 6,772,320 B1 | 8/2004 | Raj | |
| 7,047,396 B1* | 5/2006 | Fotland et al. | 712/221 |
| 7,062,525 B1 | 6/2006 | Lin | |
| 7,865,693 B2* | 1/2011 | Eichenberger et al. | 712/2 |
| 2002/0026569 A1* | 2/2002 | Liao et al. | 712/4 |
| 2002/0184282 A1* | 12/2002 | Yuval et al. | 708/495 |
| 2004/0267857 A1 | 12/2004 | Abel et al. | |
| 2006/0004988 A1 | 1/2006 | Jordan | |
| 2006/0190700 A1* | 8/2006 | Altman et al. | 712/7 |
| 2009/0307656 A1* | 12/2009 | Eichenberger et al. | 717/110 |
| 2011/0004644 A1* | 1/2011 | Henry et al. | 708/231 |

OTHER PUBLICATIONS

Hyde (Art of Assembly)—Chapter 11.7 MMX Technology Instructions, Apr. 27, 2004, 29 total pages; accessed at http://web.archive.org/web/20040427205746/http://webster.cs.ucr.edu/AoA/Windows/HTML/TheMMXInstructionSeta2.html on Oct. 2, 2011.*

Intel (IA-32 Intel Architecture Software Developer's Manual vol. 2A: Instruction Set Reference A-M); Sep. 2005; pp. 1 and 3-32 to 3-37.*

Pending U.S. Appl. No. 11/964,604, filed Dec. 26, 2007.

Ramanathan et al., White Paper, "Extending the World's Most Popular Processor Architecture," Copyright 2006, pp. 8. http://download.intel.com/technology/architecture/new-instructions-paper.pdf.

Holger Bettag, Why AltiVec is a Good Thing, 1998, pp. 8. http://www.informatik.uni-bremen.de/~hobold/av/AltiVec.asc.

David Martin, Vector Extensions to the MIPS-IV Instruction Set Architecture "The V-IRAM Architecture Manual", Revision 3.7.5, Mar. 4, 2000.

Intel, "Intel 64 and IA-32Architectures Software Developer's Manual", vol. 1: Basic Architecture, Nov. 2007, Order No. 253665-025US., total No. pp. 32 (cover p. to 1-10).

Intel, "Intel 64 and IA-32 Architectures Software Developer's Manual", vol. 1: Basic Architecture, Nov. 2007, Order No. 253665-025US., total No. pp. 90 (10-1 to 12-30).

Intel, "Intel 64 and IA-32 Architectures Software Developer's Manual", vol. 1: Basic Architecture, Nov. 2007, Order No. 253665-025US., total No. pp. 52 (E-1 to Index-18).

Hyde (Art of Assembly)—Chapter 11.7 MMX Technology Instructions, Apr. 27, 2004, 29 total pages; accessed at http://web.archive.org/web/20040427205746/http://webster.cs.ucr.edu?AoA/Windows/HTML/TheMMXInstructionSeta2.html on Oct. 2, 2011.

Motorola et al. (AltiVec Technology Programming Environments Manual): ALTIVECPEM/D: Rev. 2.0; Feb. 2002: 370 total pages.

Abrash (A First Look at the Larrabee New Instructions (LRBni)); Dr. Dobb's Journal; http://www.ddj.com/architect/216402188— published Apr. 1, 2009; accessed Jan. 14, 2010; 24 pages.

Notice of Allowance from Chinese Patent Application No. 200810190320.2, mailed Jan. 16, 2013, 4 pages.

First Office action with summarized English translation from Chinese Patent Application No. 200810190320.2, mailed Aug. 8, 2011, 25 pages.

Second Office action with summarized English translation from Chinese Patent Application No. 200810190320.2, mailed Apr. 23, 2012, 13 pages.

Third Office action with summarized English translation from Chinese Patent Application No. 200810190320.2, mailed Aug. 2, 2012, 8 pages.

First Office action with summarized English translation from Chinese Patent Application No. 201310080591.3, mailed Dec. 4, 2014, 14 pages.

Second Office action with summarized English translation from Chinese Patent Application No. 201310080591.3, mailed Jul. 31, 2015, 11 pages.

Third Office action with summarized English translation from Chinese Patent Application No. 201310080591.3, mailed Feb. 25, 2016, 12 pages.

Talluri, Madhusudhan, "Use of Superpages and Subblocking in the Address Translation Hierarchy," Dissertation at the University of Wisconsin-Madison, 1995, 193 pages.

* cited by examiner

METHODS, APPARATUS, AND INSTRUCTIONS FOR CONVERTING VECTOR DATA

RELATED APPLICATIONS

This is a Continuation of application Ser. No. 13/762,220, filed Feb. 7, 2013, currently pending, which is a Continuation of application Ser. No. 11/964,631, filed Dec. 26, 2007, currently pending.

FIELD OF THE INVENTION

The present disclosure relates generally to the field of data processing, and more particularly to methods and related apparatus for converting data used in vectors.

BACKGROUND OF THE INVENTION

A data processing system may include hardware resources, such as one or more processors, random access memory (RAM), read-only memory (ROM), etc. A processor may include multiple processing cores. The processing system may also include software resources, such as a basic input/output system (BIOS), a virtual machine monitor (VMM), and one or more operating systems (OSs).

A processor may provide hardware support for processing vectors. A vector is a data structure that holds a number of consecutive elements or data items. A vector register of size M may contain N vector elements of size O, where N=M/O. For instance, a 64-byte vector register may be partitioned into (a) 64 vector elements, with each element holding a data item that occupies 1 byte, (b) 32 vector elements to hold data items that occupy 2 bytes (or one "word") each, (c) 16 vector elements to hold data items that occupy 4 bytes (or one "doubleword") each, or (d) 8 vector elements to hold data items that occupy 8 bytes (or one "quadword") each.

To provide for data level parallelism, a processor may support single instruction, multiple data (SIMD) operations. SIMD operations involve application of the same operation to multiple data items. For instance, in response to a single SIMD add instruction, a processor may add a specified value to each element in a vector.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

This disclosure describes certain new types of machine instructions, each of which combines a data format conversion operation with one or more vector operations. For instance, one type of instruction fuses or combines a convert operation with a vector register load operation. This type of instruction may be referred to in general as a vector-load-convert-and-write (or "VLoadConWr") instruction. Another type (which alternatively could be considered a variation of the VLoadConWr type) combines a convert operation, a vector arithmetic operation, and a vector register load operation. This type of instruction may be referred to in general as a vector-load-convert-compute-and-write (or "VLoadConComWr") instruction. Another type combines a convert operation and an operation for storing data from a vector register to memory. This type of instruction may be referred to in general as a vector-convert-and-store (or "VConStore") instruction. The term "fused vector convert instructions" may be used in general to refer to VLoadConWr, VLoadConComWr, and VConStore instructions. This disclosure also describes related apparatus and methods.

Figure 1:
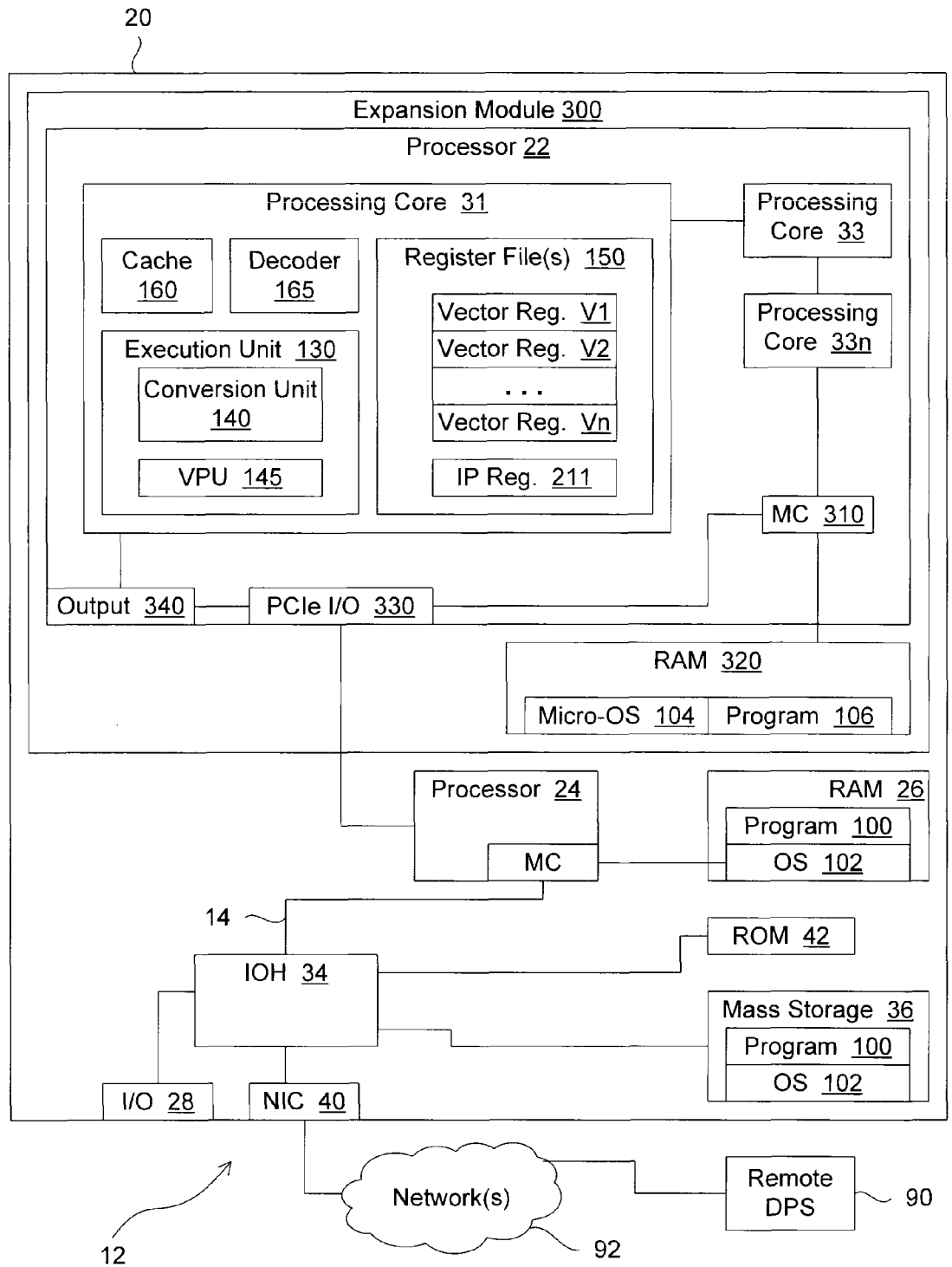
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware and software components. The hardware components include processor 22 and processor 24. Processor 24 may operate as a central processing unit (CPU), and processor 22 may serve as an auxiliary processor or coprocessor. Each processor may include one or more processing units or cores. The processing units may be implemented as Hyper-Threading (HT) technology, or as any other suitable technology for executing multiple threads or instructions simultaneously or substantially simultaneously.

Processing system may also include other hardware components, and the hardware components may be communicatively coupled via one or more system buses 14 or other communication pathways or mediums. This disclosure uses the term "bus" to refer to shared (e.g., multi-drop) communication pathways, as well as point-to-point pathways, interconnect rings, etc. In the embodiment of FIG. 1, processing system 20 includes one or more volatile or non-volatile data storage devices, such as RAM 26, ROM 42, mass storage devices 36 such as hard drives, and/or other devices or media, such as floppy disks, optical storage, tapes, flash memory, memory sticks, digital versatile disks (DVDs), etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 24 uses RAM 26 as main memory, and processor 24 communicates with RAM 26 via an embedded memory controller. Processor 24 may also be communicatively coupled to additional components, such as integrated drive electronics (IDE) controllers, small computer system interface (SCSI) controllers, universal serial bus (USB) controllers, input/output (I/O) ports 28, input devices, output devices such as a display, etc. A chipset or I/O hub (IOH) 34 in processing system 20 may serve to interconnect various hardware components. IOH 34 may include one or more bridges and/or hubs, as well as other logic and storage components.

Processing system 20 may be controlled, at least in part, by input from input devices such as a keyboard, a mouse, etc., and/or by directives received from another machine, biometric feedback, or other input sources or signals. Processing system 20 may utilize one or more connections to one or more remote data processing systems 90, such as through a network interface controller (NIC) 40, a modem, or other communication ports or couplings. Processing systems may be interconnected by way of a physical and/or logical network 92, such as a local area network (LAN), a wide area network (WAN), an intranet, the Internet, etc. Communications involving network 92 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

In the embodiment of FIG. 1, processor 22 resides on an expansion module 300 (e.g., an adapter card) that communicates with processing unit 24 via a peripheral component interconnect (PCI) express (PCIe) interface. Processor 22 is implemented as a single chip package that includes multiple cores (e.g., processing core 31, processing core 33, . . . processing core 33n), as well as other components, such as a memory controller 310, a PCIe controller 330, and a video output port 340 (which may include, for example, a digital-to-analog converter (DAC)). Expansion module 300 also includes RAM 320 for storing instructions and data to be used by processor 22. Processor 22 may use RAM 320 as main memory. Cache memory in processing system 20 (e.g., cache memory 160 in core 31) can also serve, at least temporarily, as main memory. The cores in processor 22 may access RAM 320 via memory controller 310, and the cores may communicate with processor 24 via PCIe controller 330. The cores may send output to a display device via output port 340. The various subsystems on expansion module 300 (e.g., the cores, the RAM, etc.) may be interconnected by any suitable communication channel or channels.

In the embodiment of FIG. 1, processing core 31 includes one or more register files 150. Register files 150 include various vector registers (e.g., vector register V1, vector register V2, . . . , vector register Vn). Register files 150 may also include various other registers, such as one or more instruction pointer (IP) registers 211 for keeping track of the current or next processor instruction(s) for execution in one or more execution streams or threads, and other types of registers. Processing core 31 also includes a decoder 165 and an execution unit 130. Decoder 165 recognizes and decodes instructions of an instruction set that includes fused vector convert instructions, for execution by execution unit 130.

Some or all of the cores in processing system 20 may be able to execute instructions in parallel with each other. In addition, each individual core may be able to execute SIMD instructions. For instance, each core may operate as a 16-wide vector machine, processing up to 16 elements in parallel. In particular, these kinds of vector operations may be handled by control logic referred to as a vector processing unit (VPU). For vectors with more than 16 elements, software may split the vector into subsets that each contain 16 elements (or a multiple thereof), with two or more subsets to execute substantially simultaneously on two or more cores. Also, one or more of the cores may be superscalar (e.g., capable of performing parallel/SIMD operations and scalar operations).

In the embodiment of FIG. 1, at least part of a VPU 145 resides within execution unit 130. As explained in greater detail below, execution unit 145 also includes a conversion unit 140 for converting data between an internal format suitable for VPU 145 and an external format specified by software.

The other processing cores may also include components like a decoder, an execution unit, a cache memory, register files, etc. Processor 22 and processor 24 may include additional circuitry which is not necessary to the understanding of the present invention.

In the embodiment, of FIG. 1, decoder 165 is for decoding instructions received by processing core 31, and execution unit 130 is for executing instructions received by processing core 31. For instance, decoder 165 may decode machine instructions received by processor 22 into control signals and/or microcode entry points. These control signals and/or microcode entry points may be forwarded from decoder 165 to execution unit 130. For example, in response to receiving a VLoadConWr instruction, decoder 165 may cause execution unit 130 to perform the required data conversion and register load operations. In response to receiving a VLoadConComWr instruction, decoder 165 may cause execution unit 130 to perform the required data conversion, vector arithmetic, and register load operations. In response to receiving a VConStore instruction, decoder 165 may cause execution unit 130 to perform the required conversion and store operations.

The invention may be described herein with reference to data such as instructions, functions, procedures, data structures, application programs, configuration settings, etc. When the data is accessed by a machine, the machine may respond by performing tasks, defining abstract data types, establishing low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. The term "program" may also be used to refer to a set of one or more instructions resulting from processes such as translation, interpretation, compilation, linking, etc. Thus, the term "program" may be used to refer to any collection of instructions which, when executed by a processing system, performs a desired operation or operations.

In the embodiment of FIG. 1, mass storage device 36 contains an OS 102 and at least one program 100. Processing system 20 can copy OS 102 and program 100 into RAM 26 and then execute OS 102 and program 100 on processor 24. OS 102 and/or program 100 may include one or more fused vector convert instructions (e.g., VLoadConWr, VLoadConComWr, and/or VConStore instructions).

Alternatively, when program 100 executes, it may cause OS 102 to generate one or more fused vector convert instructions, and processor 24 may send the fused vector convert instructions to processor 22. Processor 22 may store the instructions received from processor 24 in RAM 320 as program 106, and RAM 320 may also include a micro-OS 104 that runs on one or more of the cores and controls execution of program 106.

For instance, program 100 could be a video game, and OS 102 could provide a graphics application program interface (API) for program 100 to use for requesting various functions pertaining to graphics, such as ray tracing, rasterization, etc. When program 100 calls the API, a device driver in OS 102 may respond by generating fused vector convert instructions and other instructions to be executed by processor 22. Processor 24 may send those instructions to processor 22, to be stored as program 106, as indicated above. Micro-OS 104 may then schedule those instructions to run on processing core 31, for instance. Of course, in different embodiments, the programs may serve different kind of functions or applications, such as text processing, physics simulations, etc.

In one example application, processing system 20 uses processor 22 to handle vector operations (e.g., graphics rendering workloads), and those operations involve data structures with formats that differ from the formats used by processor 22 for most internal operations. For example, processing core 31 may provide 512-bit vectors, and VPU 145 may operate on those vectors as either DWORD vectors or QWORD vectors. A DWORD vector is a 16-element vector having 32 bits per element. A QWORD vectors is an 8-element vector and having 64 bits per element. Accordingly, VPU 145 may use the following formats for vector operations:

float32: 32 bit floating point (or "single precision floating point"),
float64: 64 bit floating point (or "double precision floating point"),
sint32: 32 bit signed integer, and
uint32: 32 bit unsigned integer.

Specifically, in the embodiment of FIG. 1, VPU 145 uses one of the following internal representations for each element of a vector:

float32 for DWORD vectors,
sint32 for DWORD vectors,
uint32 for DWORD vectors, or
float64 for QWORD vectors.

However, software may choose to encode vector data (e.g., graphics rendering workloads) in memory using a format that differs from these internal formats. For example, graphics software may use data structures with formats such as the following:

float16: 16-bit floating-point number;
float11: 11-bit floating-point number;
float10: 10-bit floating-point number;
uint16: 16-bit value that maps to an integer number in the range [0, 65535];
uint8: 8-bit value that maps to an integer number in the range [0, 255];
sint16: 16-bit value that maps to an integer number in the range [−32768, 32767];
sint8: 8-bit value that maps to an integer number in the range [428, 127];
snorm16: 16-bit value that maps to a floating-point number in the range [−1, 1];
snorm8: 8-bit value that maps to a floating-point number in the range [−1, 1];
srgb8: 8-bit value that maps through a gamma correction function (generally implemented as a lookup table) to a floating-point number in the range [0, 1];
unorm16: 16-bit value that maps to a floating-point number in the range [0, 1];
unorm10: 10-bit value that maps to a floating-point number in the range [0, 1];
unorm8: 8-bit value that maps to a floating-point number in the range [0, 1];
unorm2: 2-bit value that maps to a floating-point number in the range [0, 1];
float11A11B10C: a packed datatype having a 32-bit packet of two FLOAT11 values and one FLOAT10 value, being the last one located in the higher order bits; and
unorm10A10B10C2D: a packed datatype having a 32-bit packet of three UNORM10 values and one UNORM2 value, being the last one located in the higher order bits.

Furthermore, with regard to unorm10A10B10C2D, the four different sets of bits holding the different values may be referred to as fields A, B, C, and D. Similarly, the three different sets of bits in float11A11B10C may be referred to as fields A, B, and C.

A conventional system might use an array of float32 elements to process a large two dimensional array of float16 data elements (to represent one color channel of the screen, for example). However, the float32 array may occupy twice as much space as a float 16 array. Consequently, if the float32 array is to remain cache resident, a significant percentage of the cache may be unavailable for other uses.

By contrast, in the embodiment of FIG. 1, program 106 uses fused vector convert instructions. Those instructions allow the data in cache 160 to remain in a smaller format (e.g., float16), while being processed by VPU 145 in a larger format (e.g., float32). As indicated above, the fused vector convert instructions include the VLoadConWr instruction, the VLoadConComWr instruction, and the VConStore instruction. These instructions use vectors as a source, or produce vectors as a result, or both. VPU 145 may compute all of the elements of the vector in parallel.

Since VPU 145 can only operate on vectors with the internal formats described above, it may be necessary to convert the external format used by software into one of the internal representations before processing core 31 can load the vector into VPU 145. For instance, if program 106 uses vectors with float16 elements, a VLoadConWr instruction can be used to read the float16 vector data from memory, convert that data to one of the internal formats supported by VPU 145 (e.g., float32), and load the converted data into a vector register. Similarly, the VConStore instruction can be used for converting vector register data from an internal representation to an external representation, and then storing the data in the external format to memory.

Like the VLoadConWr instruction, the VLoadConComWr instruction provides for converting from an external format to an internal format, and for loading the internal format into a vector register. However, the VLoadConComWr instruction allows a vector arithmetic operation to be combined with those operations.

Figure 2:
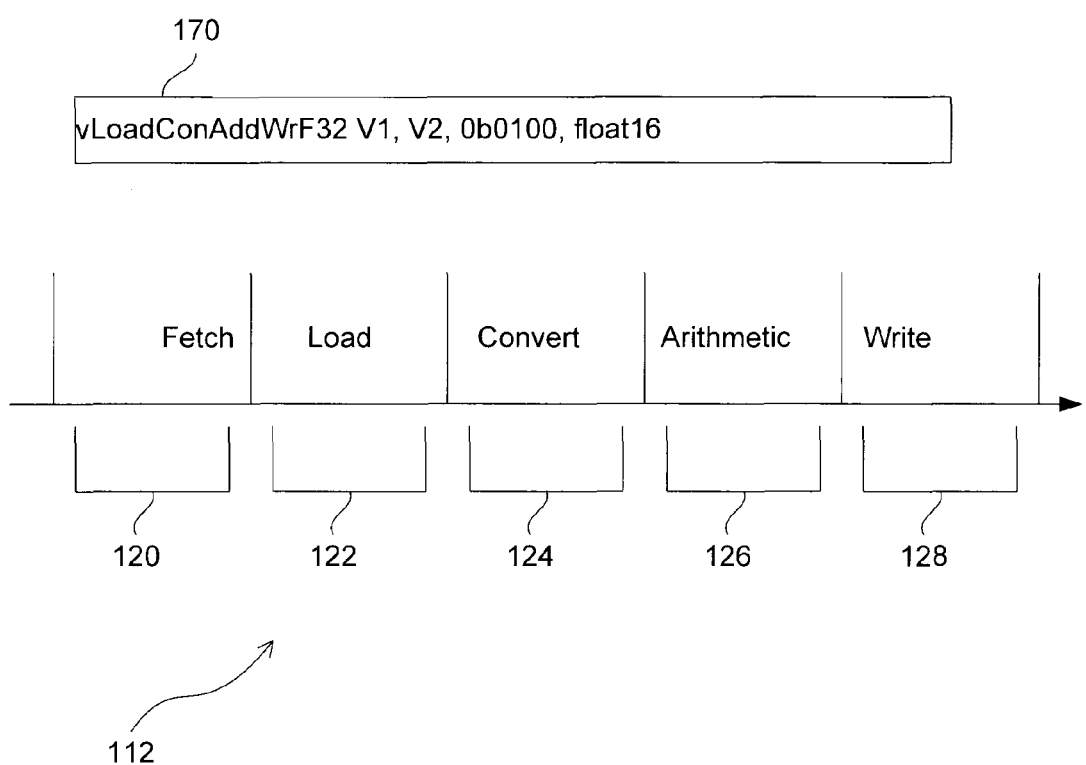
FIG. 2 is a block diagram of an example instruction and a corresponding execution pipeline according to an example embodiment of the present invention.

FIG. 2 is a block diagram of an example VLoadConComWr instruction 170, and a corresponding execution pipeline 112, according to an example embodiment of the present invention. In the embodiment of FIG. 2, VLoadConComWr instruction 170 includes the following components:

an operation code (opcode): vLoadConAddWrF32,
a destination argument: V1,
a register source argument: V2, a memory source argument: 0b0000 (where the prefix 0b denotes binary notation), and a format argument: float16.

Also, pipeline 112 includes the following five stages:

stage 120: fetch instruction from memory,
stage 122: read data from memory,
stage 124: convert data,
stage 126: perform arithmetic, and
stage 128: load result to vector register.

In one embodiment, processing core 31 can execute 5 pipelines in parallel, with each pipeline having 5 stages. Processing may proceed from each stage to the next on each clock cycle or tick in processing core 31. Consequently, processing core 31 can efficiently use the circuitry for each stage, for instance by fetching the next instruction as soon as the current instruction moves from fetch stage 120 to read stage 122. In other embodiments, processing cores may use fewer pipelines or more pipelines, and the pipelines may use fewer stages or more stages.

Figure 3:
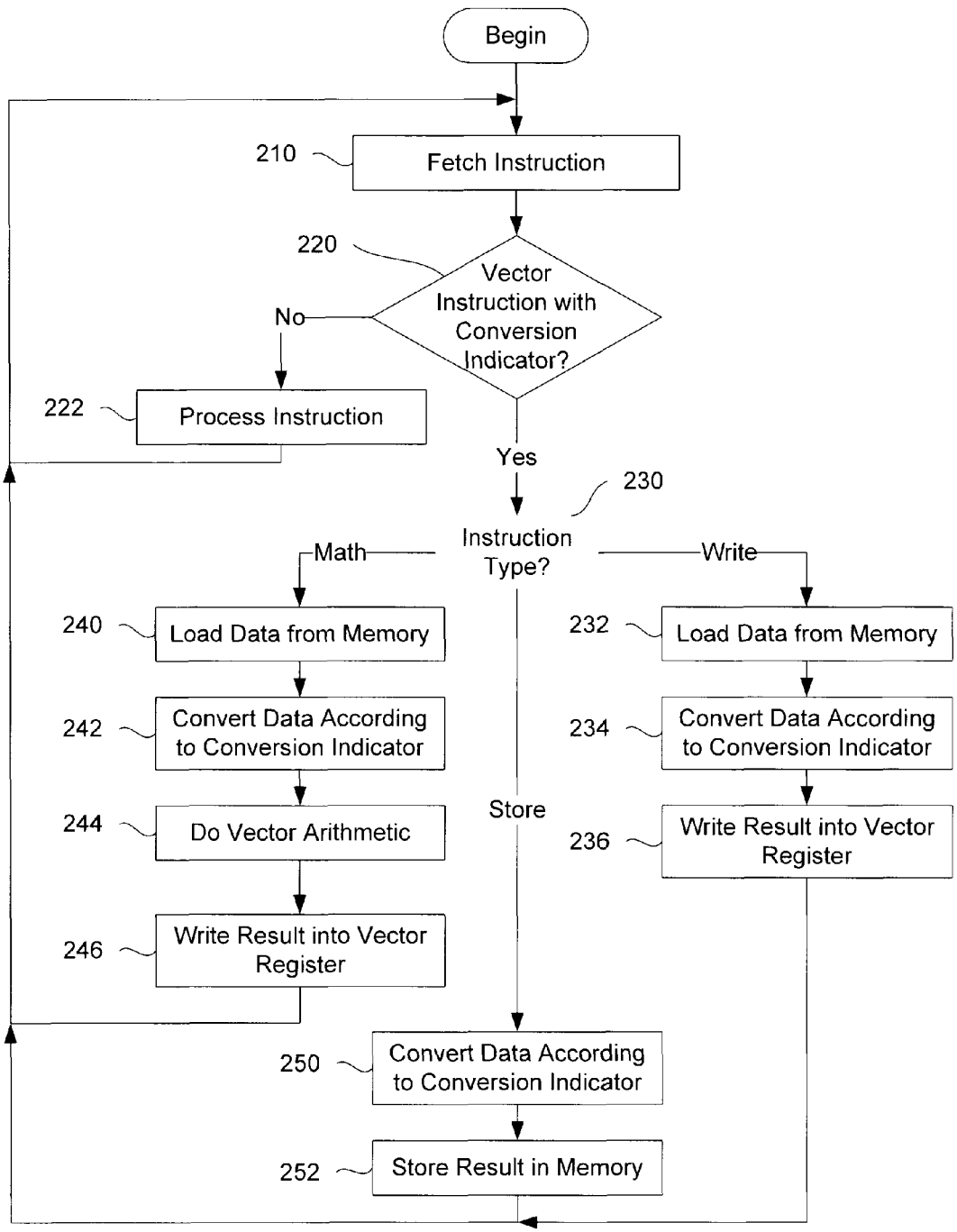
FIG. 3 is a flowchart of an example embodiment of a process for processing vectors in the processing system of FIG. 1.

FIG. 3 is a flowchart of an example embodiment of a process for processing vectors in the processing system of FIG. 1. The illustrated process begins after a set of instructions, referred to herein as program 106, has been stored in RAM 320, as indicated above. At block 210, processing core 31 fetches one of the instructions in program 106 from RAM 320. At block 220, decoder 165 determines what kind of instruction has been fetched. In particular, decoder 165 determines whether the instruction is a fused vector convert instruction. If the instruction is not a fused vector convert instruction, processing core 31 may use more or less conventional techniques to execute the instruction, as depicted at block 222. However, if the instruction is a fused vector convert instruction, processing may proceed along one of three different paths, depending on the type of fused vector convert instruction, as indicated at block 230.

If the instruction is a VLoadConWr instruction, the process may follow the "load" path to block 232, which shows that processing core 31 reads data in an external format from memory. As indicated at block 234, conversion unit 140 may then convert the data to an internal format, based at least in part on a conversion indicator in the instruction. Execution unit 130 may then save the data in the internal format to a specified vector register, as shown at block 236.

Figure 4:
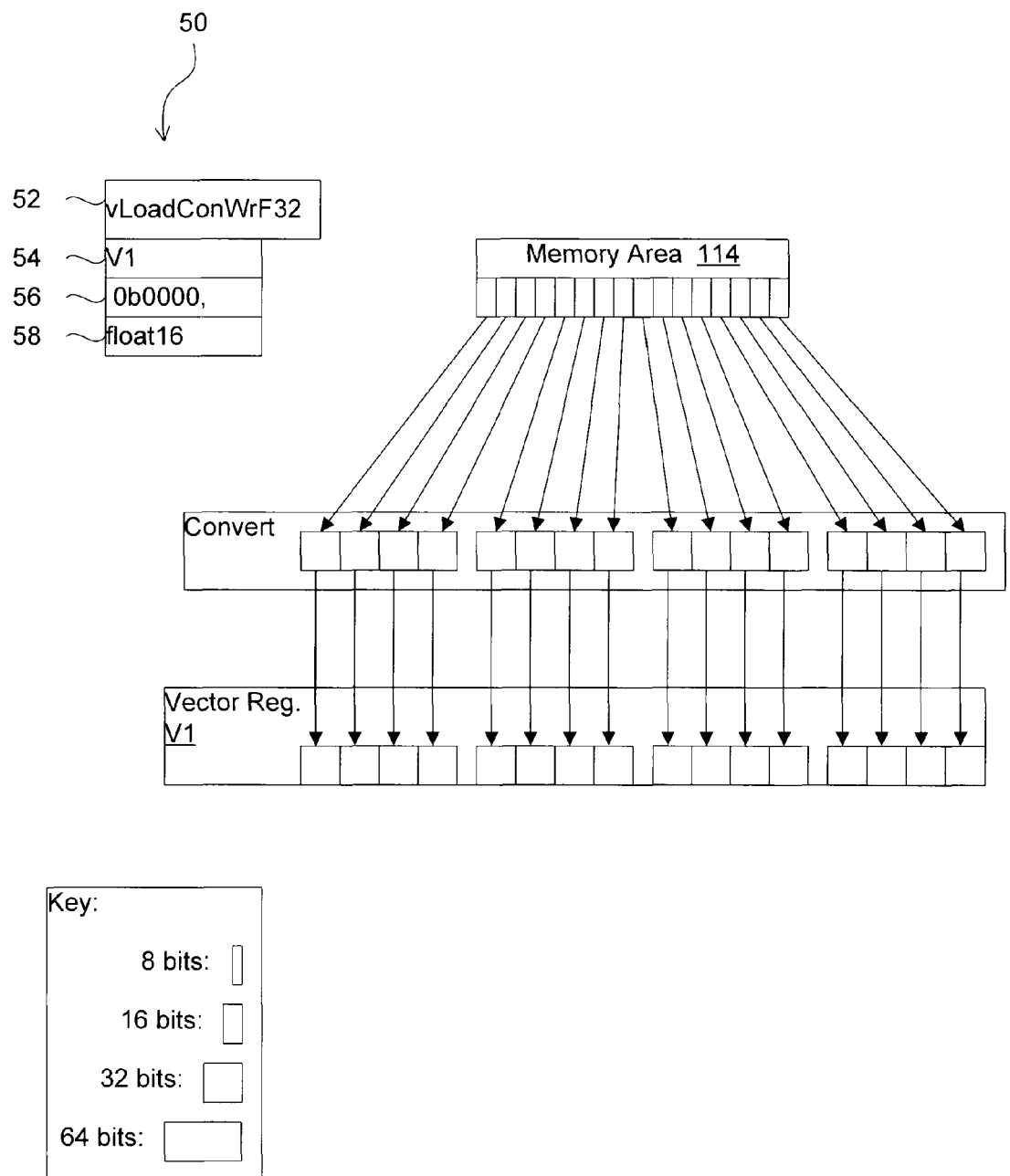
FIG. 4-6 are block diagrams depicting example vector-load-convert-and-write instructions and associated storage constructs according to example embodiments of the present invention.

For instance, FIG. 4 is a block diagram depicting an example VLoadConWr instruction 50 and associated storage constructs, according to an example embodiment of the present invention. As illustrated, VLoadConWr instruction 50 includes the following components:

an opcode 52: VLoadConWrF32,
a destination argument 54: V1,
a memory source argument 56: 0b0000, and
a format argument 58: float16.

As explained above with regard to blocks 232, 234, and 236 of FIG. 3, when processing core 31 executes VLoadConWr instruction 50, execution unit 130 reads data from memory in an external format, converts the data to an internal format, and writes the data in the internal format to a vector register. In the embodiment of FIG. 4, execution unit 130 determines that the instruction type calls for following the "load" path, based at least in part on opcode 52. Memory source argument 56 identifies the memory location or memory area from which the data is to be read. For instance, memory source argument 56 may specify a memory location or the start of a memory area 114 from which vector elements are to be read. Format argument 58 identifies the external format for the data in memory. For instance, a format argument of float16 may indicate that each vector element in memory occupies 16 bits, with memory source argument 56 identifying the location of the first element. Destination argument 54 identifies the vector register to receive the converted data.

Thus, format argument 58 constitutes a format indicator that influences how VLoadConWr instruction 50 is executed. In addition, part of the opcode may serve as another format indicator. For instance, the "F32" suffix may also influence how VLoadConWr instruction 50 is executed. In the embodiment of FIG. 4, the format argument of float16 and the "F32" suffix indicate that data is to be read from memory using a float16 format and converted to a float32 format, to be used internally in the vector register.

Part of the opcode may also serve as a broadcast indicator for selecting from among a variety of different type of load operations. For instance, processing core 31 may support a one-to-one load, as depicted in FIG. 4, where each element in the vector register gets a corresponding element from the vector in memory. Processing core 31 may also support a one-to-many broadcast load and a four-to-many broadcast load, as explained in greater detail below with regard to FIGS. 5 and 6. When the opcode includes "Broad1," execution unit 130 may perform operations like those shown in FIG. 5, and when the opcode includes "Broad4," execution unit 130 may perform operations like those shown in FIG. 6.

Figure 5:
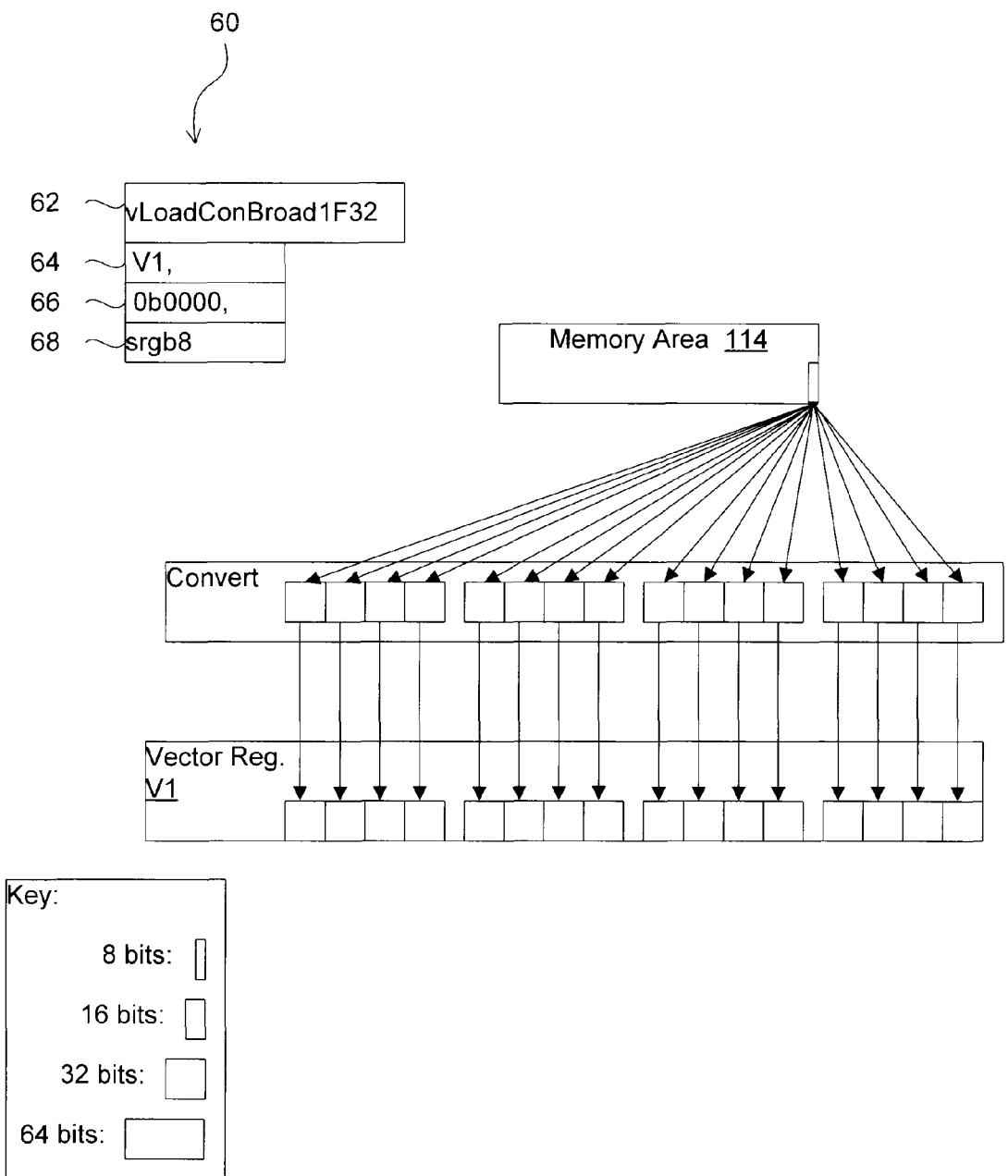

FIG. 5 is a block diagram depicting a one-to-many VLoadConWr instruction 60 and associated storage constructs, according to an example embodiment of the present invention. As shown, in this case, the opcode 62 is "vLoadConBroad1F32," the destination argument 64 is V1, the memory source argument 66 is 0b0000, and the format parameter 68 is srgb8. Consequently, when executing VLoadConWr instruction 60, processing core 31 reads a single data item from the first 8-bit location in memory area 114, based on source argument 66 and format parameter 68. In addition, conversion unit 140 converts that data item to float32, based on the format attribute "F32" within opcode 62. VPU 145 then saves a copy of the converted data into each of the 16 vector elements of V1, based on destinaion argument 64.

Figure 6:
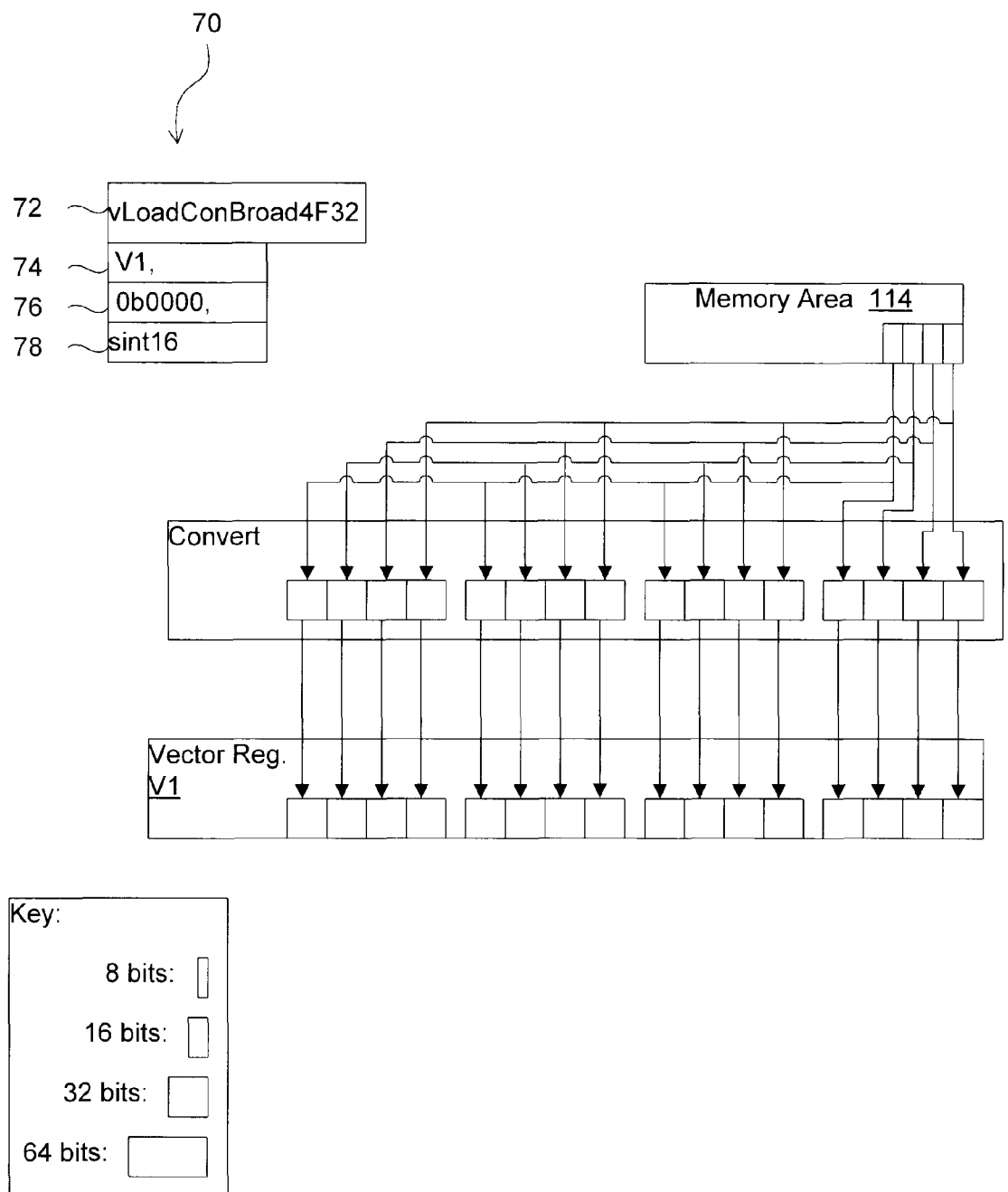

FIG. 6 is a block diagram depicting a four-to-many VLoadConWr instruction 70 and associated storage constructs, according to an example embodiment of the present invention. In FIG. 6, the opcode 72 is "vLoadConBroad4F32," the destination argument 74 is V1, the memory source argument 76 is 00000, and the format parameter 78 is sint16. When executing VLoadConWr instruction 70, processing core 31 reads four data items from the first four 16-bit locations in memory area 114, based on source argument 76, format parameter 78, and the selection indicator "Broad4" within opcode 72. Conversion unit 140 then converts each of those items to float32, based on the format indicator "F32" in opcode 72. Execution unit 130 then saves the converted data in V1 as a broadcast, based on destination argument 74 and the selection indicator "Broad4" within opcode 72. That is, the 16 elements of V1 are treated as four sets of four consecutive elements, and each of those sets gets one copy of the four converted data items.

Thus, processor 22 supports a variety of different VLoadConWr instructions. However, each of the VLoadConWr instructions is a single machine instruction that causes processing core 31 to read data from memory, convert that data to another format, and load the converted data into a vector register. In one embodiment, VLoadConWr supports the following data format conversions:

float16 to float32,
srgb8 to float32,
uint8 to float32,
sint to float32,
unorm8 to float32,
snorm8 to float32,
uint16 to float32,
sint16 to float2,
unorm16to float2,
snorm16 to float32,
uint8 to uint32,
sint8 to sint32,
uint16 to uint32,
sint16 to sint32,
unorm10 A10 B10 C2 D field A (unorm10 A) to float32,
unorm10 A10 B10 C2 D field B (unorm10 B) to float32,
unorm10 A10 B10 C2 D field C (unorm10 C) to float32,
unorm10 A10 B10 C2 D field D (unorm2 D) to float32,
float11 A11 B10 C field A (float11 A) to float32,
float11 A11 B10 C field B (float11 B) to float32, and
float11 A11 B10 C field C (float10 C) to float32.

Other data format conversions may be supported in alternative embodiments.

Referring again to FIG. 3, processing core 31 may use different paths when executing VLoadConComWr instructions and VConStore instructions. For instance, when processing core 31 decodes a VLoadConComWr instruction, the process of FIG. 3 may pass through block 230 along the "math" path to blocks 240 and 242, which, like blocks 232 and 234, depict execution unit 130 reading data from memory in an external format and converting that data to an internal format. However, the path for VLoadConComWr instructions also includes vector arithmetic operations to be performed, as shown at block 244. The vector arithmetic operations may be performed by a vector arithmetic logic unit (ALU) in processing core 31. Accordingly, the vector arithmetic operations may also be referred to as vector ALU operations. Such operations may also be referred to as vector math. The results of the vector math may then be loaded into the destination vector register, as depicted at block 246.

For example, when executing a VLoadConComWr instruction, processing core 31 may read a vector in an external format from memory. Processing core 31 may also convert the data to an internal format. The vector ALU operation may use the converted data and possibly another vector register source to produce a vector register result.

Figure 7:
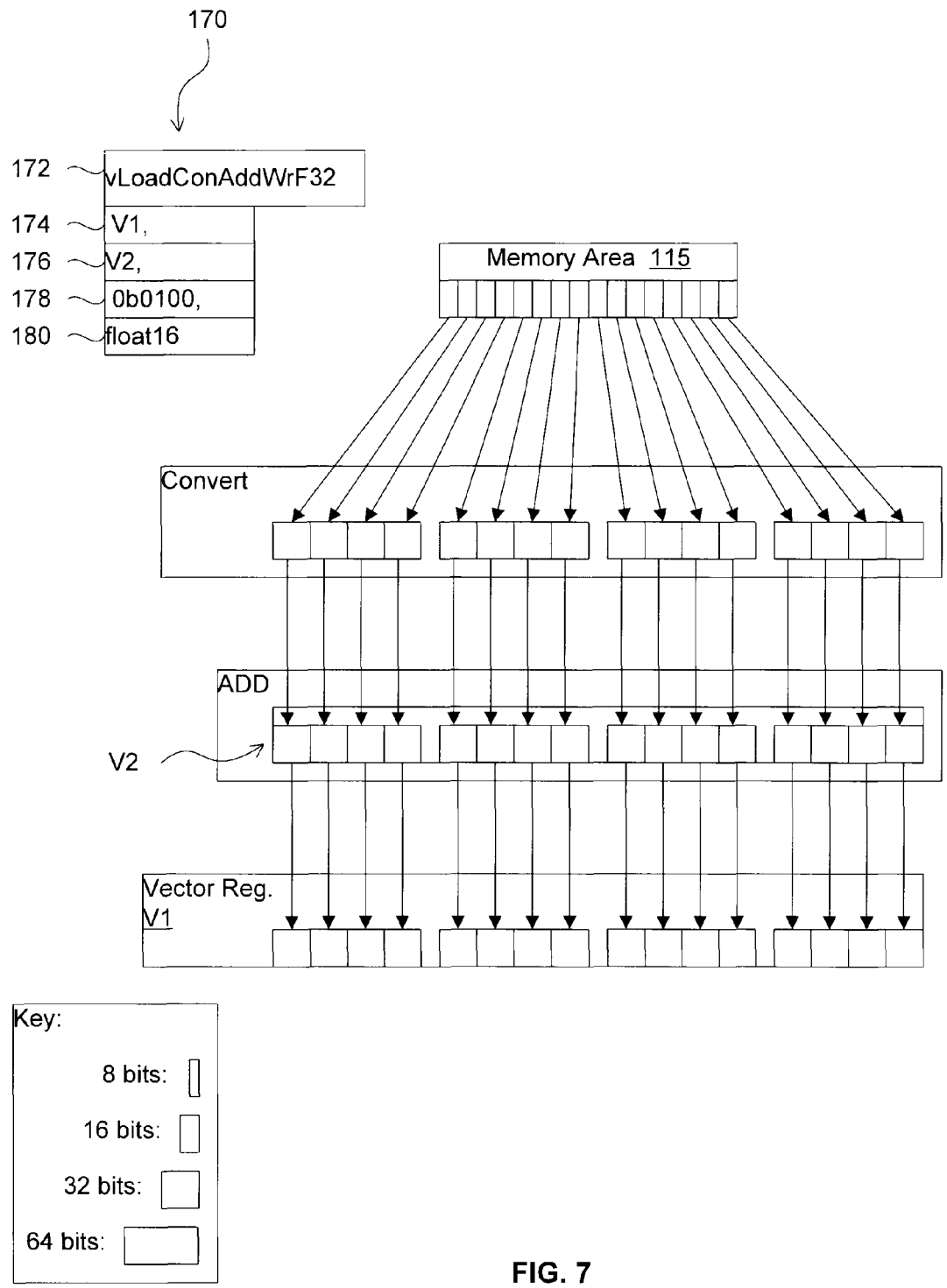
FIG. 7 is a block diagram depicting an example vector-load-convert-compute-and-write instruction and associated storage constructs according to an example embodiment of the present invention.

FIG. 7 is a block diagram depicting an example VLoadConComWr instruction 170 and associated storage constructs according to an example embodiment of the present invention. In FIG. 7, the opcode 172 is "vLoadConAddF32," the destination argument 174 is V1, the vector operand argument 176 is V2, the memory source argument 178 is 0b0100, and the format parameter 180 is float16. When executing VLoadConComWr instruction 170, execution unit 130 may read sixteen vector elements in the float16 format from memory area 115, starting at location 0b0100, based on memory source argument 178 and format parameter 180. Conversion unit 140 may then convert each of those elements to float32, based on format parameter 180 and the format indicator "F32" in the opcode. Execution unit 130 may then use a vector ALU to perform vector addition, using the converted data from memory and the data in vector register V2, based on the arithmetic indicator "Add" in the opcode and vector operand argument 176. Execution unit 130 may then write the ALU results in vector register V1, based on destination parameter 174.

In addition, referring again to FIG. 3, processing core 31 also supports a "store" path for executing VConStore instructions. For instance, as shown at block 250, when executing a VConStore instruction, processing core 31 may convert data in a vector register from an internal format to an external format. As shown at block 252, processing core 31 may then store the converted data in memory.

Figure 8:
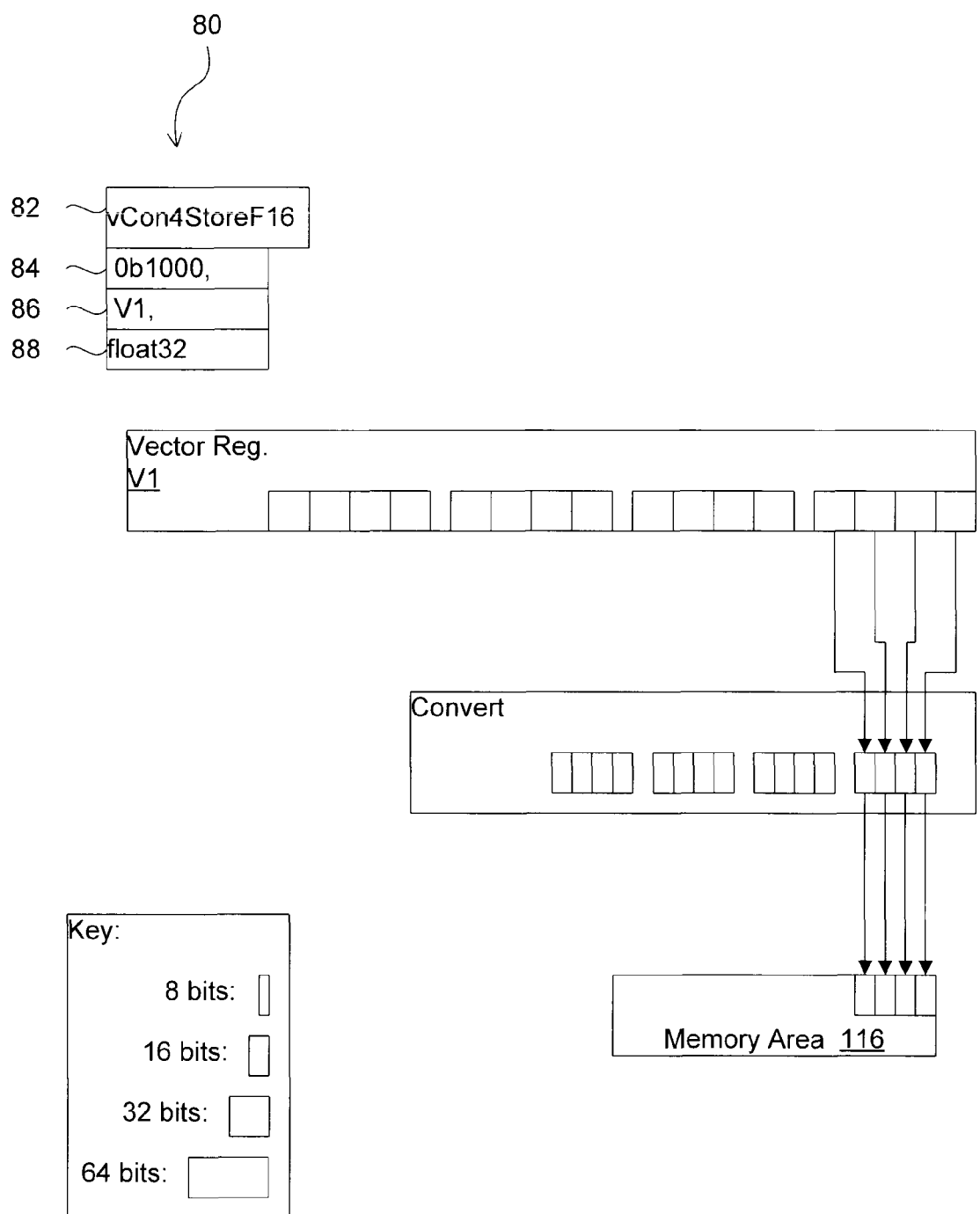
FIG. 8 is a block diagram depicting an example vector-convert-and-store instruction and associated storage constructs according to an example embodiment of the present invention.

FIG. 8 is a block diagram depicting an example VConStore instruction 80 and associated storage constructs according to an example embodiment of the present invention. In FIG. 8, the opcode 82 is "vCon4StoreF16," the destination argument 84 is 0b1000, the source argument 86 is V1, and the format parameter 88 is float32. The "4" in the opcode may serve as a selection indicator for selecting a subset of the source vector to be stored in memory. For example, the opcode "vCon4StoreF16" may indicate that the first four elements of the source register are to be converted and stored in memory. The opcode "vCon1StoreF16" may indicate that only the first element of the source register is to be converted and stored in memory. The opcode "VConStoreF16" (with no number in between the "Con" and the "Store") may indicate that the all of the elements of the source register are to be converted and stored in memory.

When executing VConStore instruction 80, conversion unit 140 may convert the selected elements from float 32 to float16, based on format parameter 88, the format indicator "F16" in the opcode, and the selection indicator "4" in the opcode. Execution unit 130 may then store the converted data in memory area 116, starting at location 0b1000, based on destination parameter 84.

In one embodiment, processing core 31 supports VConStore instructions for performing the following types of format conversions:
float32 to float16,
float32 to float16 (round to zero),
loat32 to uint8,
float32 to sint8,
float32 to unorm8,
float32 to snorm8,
float32 to uint16,
float32 to sint16,
float32 to unorm16,
float32 to snorm16,
uint32 to uint8,
sint32 to sint8,
uint32 to uint16, and
int32 to sint16.

Alternative embodiment may support other types of conversions.

As had been described, when executing a VLoadConWr instruction, a processing core may (a) load the data in an external format from memory, (b) convert the data from the external format to an internal format, and (c) load the data into a vector register, with an optional broadcast (e.g., one-to-sixteen, four-to-sixteen, etc.). Thus, VLoadConWr can be used to combine conversion and load operations, as well as broadcast operations, in a single instruction.

When executing a VLoadConComWr instruction, a processing core may (a) load the data in an external format from memory, (b) convert the data from the external format to an internal format, (c) perform a vector ALU operation, and (c) load the result into a vector register. For example, a single instruction flowing down the pipeline can do a load operation to read from memory to a temporary vector register, convert from float16 to float32 format, multiply that converted value by a second vector register, and save the result in a third vector register. In another embodiment, a VLoad- ConComWr instruction can also do a broadcast before doing the vector arithmetic. However, such an embodiment may require a longer pipeline.

When executing a VConStore instruction, a processing core may (a) optionally select a subset of the vector to store, (b) convert from an internal format into an external format, and (c) store the converted data to memory.

The operations described herein may enable programs to use 32-bit or 64-bit integer or float format for internal vector operations, while the data remains compressed to a smaller data type for interactions with memory, without the programs including extra instructions to handle conversion, in addition to operations such as load and store. Such operations may be triggered by a single instruction that provides for programmer-selectable conversion combined with operations such as store, load, and/or vector arithmetic.

In light of the principles and example embodiments described and illustrated herein, it will be recognized that the illustrated embodiments can be modified in arrangement and detail without departing from such principles. For instance, alternative embodiments may involve processing systems which feature more or fewer processors, and each processor may include any suitable number of cores. Also, alternative embodiment may use protocols or buses other than PCIe.

In some embodiments, one or more devices in the processing system may be implemented as embedded controllers, using components such as programmable or non-programmable logic devices or arrays, application-specific integrated circuits (ASICs), embedded processors, smart cards, and the like. For instance, in an alternative embodiment, a main processor may reside on a motherboard with an auxiliary processor or coprocessor that serves as a graphics coprocessor or graphics processing unit (GPU). The main processor and the auxiliary processor may communicate using any suitable type of bus or protocol. The main processor, the GPU, or both may be capable of executing instructions such as those described herein. Alternatively, some of the components from processor 24 and expansion module 300 may be integrated into a single CPU package or integrated circuit. Preferably, at least one processing core is capable of executing at least one fused vector convert instruction.

Also, the description above explains that instructions may include a variety of different indicators for identifying various characteristics of the data to be processed and the operations to be performed. For instance, opcodes (or portions thereof) and instruction parameters or arguments have been described as format indicators, selection indicators, source arguments, etc. In other embodiments, the indicators may be implemented in ways other than the specific approaches described herein.

Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. The control logic for providing the functionality described and illustrated herein may be implemented as hardware, software, or combinations of hardware and software in different embodiments. For instance, the execution logic in a processor may include circuits and/or microcode for performing the operations necessary to fetch, decode, and execute machine instructions.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A processor for executing a machine instruction combining data format conversion with at least one vector operation, the processor comprising:

a hardware execution unit to execute processor instructions comprising a vector-load-convert-and-write instruction having a format conversion indicator and a vector register indicator, and a vector-load-convert-compute-and-write instruction having the format conversion indicator and a second vector register indicator;

wherein, in response to the vector-load-convert-and-write instruction, the hardware execution unit is to:

convert data from a first format to a second format, wherein based at least in part on the format conversion indicator, the first format is a 16 bit floating-point format and the second format is a format other than the 16 bit floating-point format; and after converting the data to the second format, save the data in the second format to a plurality of N elements of a vector register identified by the vector register indicator, wherein N is the number of elements of the plurality and N varies between at least two different pluralities responsive to the vector-load-convert-and-write instruction executed; and wherein, in response to the vector-load-convert-compute-and-write instruction, the hardware execution unit is to:
convert second data from the first format to the second format, based at least in part on the format conversion indicator;
perform a vector arithmetic operation, based at least in part on the second data in the second format; and
save a result of the vector arithmetic operation to multiple elements of a vector register identified by the second vector register indicator.

2. The processor according to claim 1, wherein the hardware execution unit is further to execute a vector-convert-and-store instruction having the format conversion indicator and a memory location indicator, wherein:
in response to the vector-convert-and-store instruction, control circuitry is to:
convert data from a vector register element from the first format to the second format; and
save the data in the second format to a memory location corresponding to the memory location indicator.

3. The processor according to claim 1, wherein:
when the vector-load-convert-and-write instruction comprises a memory location indicator, the processor is to read data in the first format from a memory location corresponding to the memory location indicator, before converting the data to the second format and saving the data in the second format to the vector register.

4. The processor according to claim 1, wherein the operation of converting data from the first format to the second format comprises:
converting a data item that occupies 16 bits into a format that occupies 32 bits.

5. The processor according to claim 1, wherein the operation of converting data from the first format to the second format comprises:
converting the data from the first format wherein the second format is a floating-point format other than the 16 bit floating-point format.

6. A non-transitory machine-accessible medium having stored therein a first machine instruction for combining a data format conversion with a write operation and a second machine instruction for combining the data format conversion and a computation with the write operation, wherein:
the first and second machine instructions comprise a format conversion indicator and a vector register indicator; wherein
the first machine instruction, when executed by a processor, causes the processor to:
convert data from a first format to a second format, wherein based at least in part on the format conversion indicator, the first format is a 16 bit floating-point format and the second format is a format other than the 16 bit floating-point format; and
after converting the data to the second format, save the data in the second format to a plurality of N elements of a vector register identified by the vector register indicator, wherein N is the number of elements of the plurality and N varies between at least two different pluralities responsive to the first machine instruction executed; and
the second machine instruction, when executed, causes the processor to:
convert second data from the first format to the second format;
after converting the second data to the second format, perform a vector arithmetic operation, based at least in part on the second data in the second format; and
save a result of the vector arithmetic operation to a second plurality of M elements of the vector register identified by the vector register indicator, wherein M varies between at least two different pluralities responsive to the second machine instruction executed.

7. The non-transitory machine-accessible medium according to claim 6, wherein:
the vector register indicator comprises a first instruction argument; and
the format conversion indicator comprises at least one indicator from the group consisting of:
a second instruction argument; and
at least part of an instruction operation code.

8. The non-transitory machine-accessible medium according to claim 6, wherein the machine instruction further comprises a source argument to identify a memory location associated with the data in the first format.

9. The non-transitory machine-accessible medium according to claim 6, wherein the second format is a floating-point format other than the 16 bit floating-point format.

10. A method for handling vector instructions, the method comprising:
fetching a vector-load-convert-and-write processor instruction, the vector-load-convert-and-write processor instruction having a format conversion indicator and a vector register indicator; and
executing the vector-load-convert-and-write processor instruction by performing operations comprising:
converting data from a first format to a second format, wherein based at least in part on the format conversion indicator, the data in the first format comprises a data item that occupies a predetermined number of bits, and the operation of converting data from the first format to the second format comprises generating a new data item that occupies a different number of bits than said predetermined number of bits, wherein the first format is a 16 bit floating-point format and the second format is a format other than the 16 bit floating-point format; and
after converting the data to the second format, saving the data in the second format to a plurality of N elements of a vector register identified by the vector register indicator, wherein N is the number of elements of the plurality and N varies between at least two different pluralities responsive to the vector-load-convert-and-write processor instruction executed; and
fetching a vector-load-convert-compute-and-write processor instruction, the vector-load-convert-compute-and-write processor instruction having the format conversion indicator and a second vector register indicator; and
executing the vector-load-convert-compute-and-write processor instruction by performing operations comprising:
converting second data from the first format to the second format, based at least in part on the format conversion indicator;

after converting the second data to the second format, performing a vector arithmetic operation, based at least in part on the second data in the second format; and saving a result of the vector arithmetic operation to a second plurality of M elements of a vector register identified by the second vector register indicator, wherein M varies between the at least two different pluralities responsive to the vector-load-convert-compute-and-write processor instruction executed.

11. The method according to claim 10, wherein the second format is a floating-point format other than the 16 bit floating-point format.

12. The method according to claim 10, wherein:
the vector register indicator comprises a first instruction argument; and
the format conversion indicator comprises at least one indicator from the group consisting of:
a second instruction argument; and
at least part of an instruction operation code.

13. The method according to claim 12, wherein the vector-load-convert-and-write processor instruction further comprises a source argument to identify a memory location associated with the data in the first format.

14. A computer system, comprising:
memory to store a vector-load-convert-and-write instruction and a vector-load-convert-compute-and-write instruction;
a processor, coupled to the memory, the processor comprising:
a decoder to decode the vector-load-convert-and-write instruction, wherein the vector-load-convert-and-write instruction is to convert a plurality of N data elements from a first format to a second format, wherein the first format is a 16 bit floating-point format and the second format is a format other than a 16 bit floating-point format and wherein N is the number of elements of the plurality and N varies between at least two different pluralities responsive to the vector-load-convert-and-write instruction decoded; and said decoder to decode the vector-load-convert-compute-and-write instruction, wherein the vector-load-convert-compute-and-write instruction is to convert a second plurality of M data elements from the first format to the second format and after converting the second plurality of M data elements to the second format, to perform a vector arithmetic operation, based at least in part on the second plurality of M data elements in the second format, wherein M varies between the at least two different pluralities responsive to the vector-load-convert-compute-and-write instruction decoded.

15. The computer system according to claim 14, wherein:
the processor comprises one or more vector registers to hold multiple vector elements; and
the vector-load-convert-and-write instruction comprises:
a format conversion indicator to identify a desired data format conversion; and
a vector register indicator to identify a desired vector register among the one or more vector registers as a destination for a result of the vector-load-convert-and-write instruction.

16. The computer system according to claim 14, wherein the second format is a floating-point format other than the 16 bit floating-point format.

17. The computer system according to claim 14, wherein the second format is a 32 bit format.

18. The computer system according to claim 14, wherein the second format is a 64 bit format.

* * * * *